United States Patent
Umapathy et al.

(10) Patent No.: US 10,904,187 B2
(45) Date of Patent: *Jan. 26, 2021

(54) SYSTEMS AND METHODS FOR TEMPORARILY POSTPONING MESSAGES

(71) Applicant: Google LLC, Mountain View, CA (US)

(72) Inventors: Vijay Umapathy, Sunnyvale, CA (US); Xander Pollock, Palo Alto, CA (US); Ryan Proch, Mountain View, CA (US); Taylor Kourim, San Jose, CA (US); Liam Asher Segel-Brown, Kitchener (CA); Ryan James Fioravanti, Kitchener (CA); Michael Christopher Joseph Landry, Kitchener (CA); Shalini Agarwal, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,918

(22) Filed: Mar. 30, 2020

(65) Prior Publication Data

US 2020/0228482 A1    Jul. 16, 2020

Related U.S. Application Data

(63) Continuation of application No. 14/473,536, filed on Aug. 29, 2014, now Pat. No. 10,645,046.

(51) Int. Cl.
*G06F 15/16* (2006.01)
*H04L 12/58* (2006.01)

(52) U.S. Cl.
CPC .................................. *H04L 51/14* (2013.01)

(58) Field of Classification Search
CPC ......... H04L 51/02; H04L 51/12; H04L 51/26; H04L 51/14
See application file for complete search history.

(56) References Cited

U.S. PATENT DOCUMENTS 7,155,241 B2    12/2006  Helferich
7,213,210 B2     5/2007  Reysa
(Continued)

FOREIGN PATENT DOCUMENTS

EP            2224714 A1     9/2010

*Primary Examiner* — John B Walsh
(74) *Attorney, Agent, or Firm* — Botos Churchill IP Law LLP

(57) ABSTRACT

A method postpones a plurality of associated electronic messages displayed for a user of a computing device. Postponement options are displayed for the user. Display of the plurality of electronic messages at the computing device is inhibited based on received user input. One option enables a user to repeat the most recently selected postponement option. Another option postpones the plurality of electronic messages until the computing device is at a user-designated location. Some postponement options are generated according to context of the plurality of electronic messages, such as the content of one or more of the electronic messages in the plurality of electronic messages, the date or time when the user requested the postponement, or prior history of user-selected postponements. Some options are based on a sampling of postponement options selected by a plurality of users.

20 Claims, 7 Drawing Sheets

(56) References Cited

U.S. PATENT DOCUMENTS

| | | |
|---|---|---|
| 7,334,000 B2 | 2/2008 | Chhatrapati et al. |
| 7,583,972 B2 | 9/2009 | Clipsham |
| 7,774,407 B2 | 8/2010 | Daly et al. |
| 8,155,624 B2 | 4/2012 | Khoury |
| 8,229,413 B2 | 7/2012 | Brown et al. |
| 8,315,607 B2 | 11/2012 | Chen et al. |
| 8,345,600 B2 | 1/2013 | Chang |
| 8,533,274 B2 | 9/2013 | Buchheit et al. |
| 8,601,067 B2 | 12/2013 | Gartside et al. |
| 8,706,808 B2 | 4/2014 | Sanghavi et al. |
| 8,868,053 B2 | 10/2014 | Thompson |
| 9,338,026 B2 | 5/2016 | Bandini et al. |
| 9,654,426 B2 | 5/2017 | Underwood et al. |
| 2002/0067308 A1 | 6/2002 | Robertson |
| 2002/0169840 A1 | 11/2002 | Sheldon et al. |
| 2003/0046421 A1 | 3/2003 | Horvitz et al. |
| 2003/0105827 A1 | 6/2003 | Tan et al. |
| 2003/0135569 A1 | 7/2003 | Khakoo et al. |
| 2004/0103160 A1 | 5/2004 | Sheldon et al. |
| 2004/0210587 A1 | 10/2004 | Reysa |
| 2005/0048998 A1 | 3/2005 | Zhu |
| 2005/0261011 A1 | 11/2005 | Scott |
| 2008/0004793 A1 | 1/2008 | Horvitz et al. |
| 2008/0075257 A1 | 3/2008 | Nguyen et al. |
| 2008/0186196 A1 | 8/2008 | Lessing |
| 2009/0157708 A1 | 6/2009 | Bandini et al. |
| 2009/0209243 A1 | 8/2009 | Brown et al. |
| 2009/0228558 A1 | 9/2009 | Brenner |
| 2009/0254624 A1 | 10/2009 | Baudin et al. |
| 2009/0264116 A1 | 10/2009 | Thompson |
| 2010/0064017 A1 | 3/2010 | Buchheit et al. |
| 2010/0082759 A1* | 4/2010 | Nalliah ............ H04L 51/38 709/206 |
| 2010/0222042 A1 | 9/2010 | Bosan et al. |
| 2010/0255817 A1 | 10/2010 | Chen et al. |
| 2010/0273447 A1 | 10/2010 | Mann et al. |
| 2010/0299394 A1 | 11/2010 | Jania et al. |
| 2011/0119258 A1 | 5/2011 | Forutanpour et al. |
| 2012/0094698 A1 | 4/2012 | Casto |
| 2012/0198001 A1 | 8/2012 | Deluca |
| 2013/0095865 A1 | 4/2013 | Roets |
| 2014/0047053 A1 | 2/2014 | Chawla |
| 2014/0057606 A1 | 2/2014 | Kunjithapatham et al. |
| 2014/0156597 A1 | 6/2014 | Hakami et al. |
| 2014/0229555 A1 | 8/2014 | Deluca et al. |
| 2015/0006648 A1 | 1/2015 | Cao |
| 2015/0106741 A1 | 4/2015 | Friend et al. |
| 2015/0195232 A1 | 7/2015 | Haugen et al. |

* cited by examiner

SYSTEMS AND METHODS FOR TEMPORARILY POSTPONING MESSAGES

CROSS-REFERENCE TO RELATED APPLICATIONS

This application is a continuation of U.S. patent application Ser. No. 14/473,536, filed Aug. 29, 2014, entitled "Systems and Methods for Temporarily Postponing Messages," which is hereby incorporated by reference in its entirety. This application is also related to U.S. patent application Ser. No. 14/473,550, filed Aug. 29, 2014, entitled "Systems and Methods for Triggering Redisplay of a Postponed Message," and published as U.S. Published Application No. 2016/0065527, which is hereby incorporated by reference in its entirety.

TECHNICAL FIELD

The disclosure relates generally to electronic messaging applications, and more specifically to postponing electronic messages.

BACKGROUND

Electronic messages may be received at any time, regardless of convenience. In some cases it is useful to "snooze" a message until a later time if the message cannot be handled right away. Postponing messages can be an effective way to keep a user's message list (e.g., inbox) smaller or better organized. However, the burden of selecting and specifying a snooze time can reduce the efficiency or prompt a user not to use a snooze feature at all.

SUMMARY

Disclosed implementations address the above deficiencies and other problems associated with postponing electronic messages. When a user decides to postpone a message, the messaging application provides the user with multiple options, including repeating the snooze that was most recently selected and other options based on message context or prior user history. For example, if certain types of messages received during the week are commonly postponed to Saturday by a certain user, then that postponement option would be on the quick selection list when the circumstances are matched.

In accordance with some implementations, a method of postponing an electronic message is performed at a computing device having one or more processors and memory. The memory stores one or more programs configured for execution by the one or more processors. An electronic message is displayed for a user of the computing device. The user provides input to indicate the decision to postpone the electronic message. In response to the user input, postponement options are displayed for the user in a user interface window. The user selects one of the postponement options and display of the electronic message at the computing device is inhibited according to the selected postponement option.

In some implementations, the electronic message is a task reminder. In other implementations, the electronic message is an email message.

The plurality of postponement options may include a variety of postponement options. In some implementations, there is an option to repeat a most recently selected postponement option (e.g., the most recently selected specific date and time for postponement). In some implementations, there is an option to postpone the electronic message for a user-specified duration (e.g., an hour or a day). In some implementations, there is an option to postpone the electronic message until a user-specified date and time. In some implementations, there is an option to postpone the electronic message until the computing device is within a threshold distance of a user-designated location. In some implementations, there is an option to inhibit display of the electronic message at the computing device, but to enable display of the electronic message at a user-specified second computing device distinct from the computing device. For example, if a user receives a personal email while at work, the user may postpone the message until the user is at home accessing email from a home computer. In some implementations, there is an option to postpone the electronic message indefinitely. This may be appropriate when the user does not know when it will be possible to address the message, but does not want the message cluttering an inbox in the meantime. When a message is postponed indefinitely, some implementations inhibit display of the electronic message until receiving subsequent user input to display postponed messages.

In some implementations, there are one or more options generated according to context of the electronic message. The context of the electronic message may include the content of the electronic message, a date and/or time when the user input to postpone the electronic message was received, and/or prior history of postponement options selected by the user. In some implementations, the various types of context information are combined using a machine learning technique (e.g., a neural network or a support vector machine).

In some implementations, there are one or more options of commonly selected postponement options based on a sampling of postponement options selected by a plurality of users. In some implementations, the one or more commonly selected postponement options include one or more of "later today," "tomorrow," and "next week."

Thus methods and systems are provided that enable a user to quickly postpone an electronic message to an appropriate time in the future.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
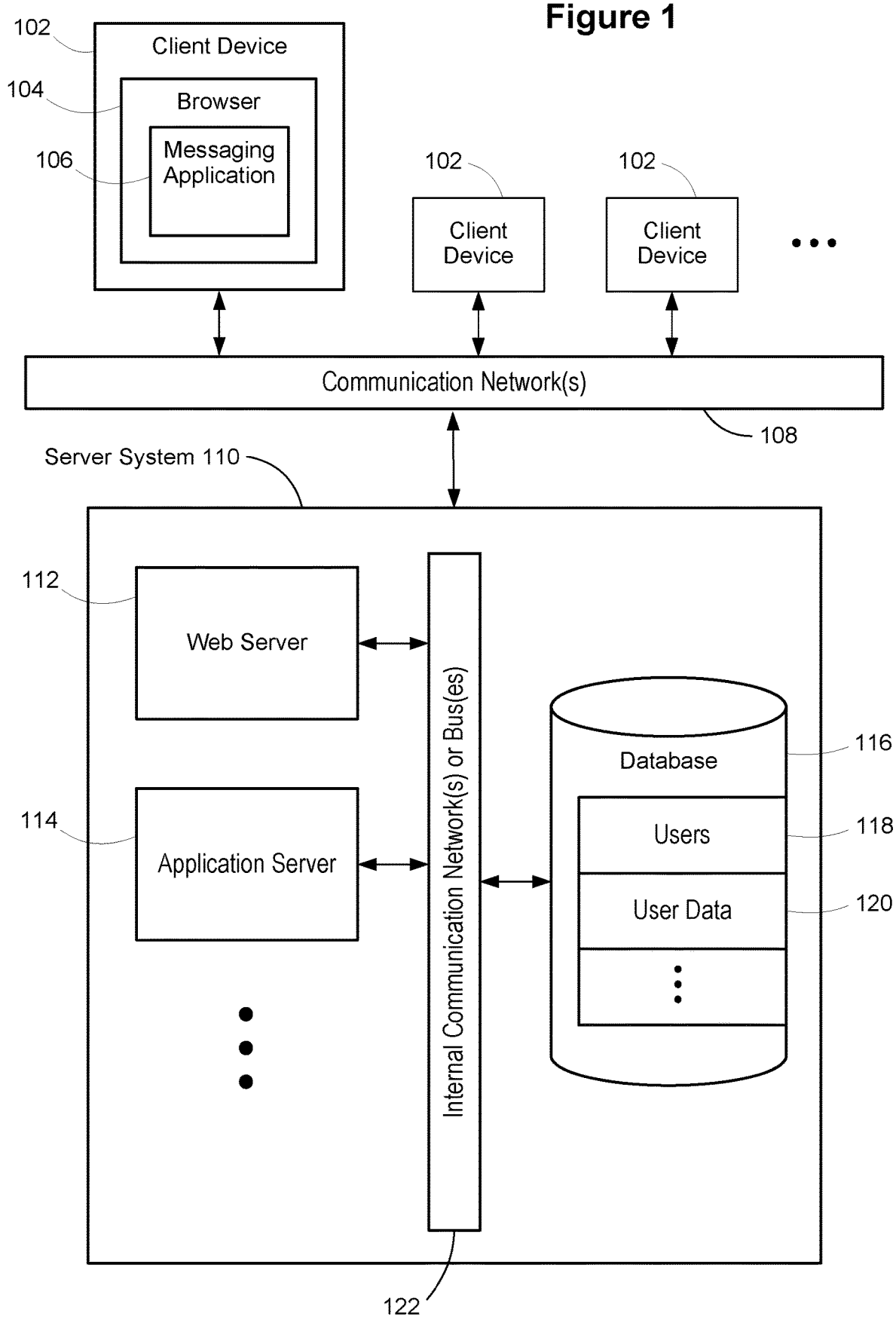
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). A client device 102 may be a smart phone, a tablet computer, a laptop computer, a desktop computer, or other computing device that has access to a communication network 108 and can run a messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network or bus 122. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, and various user information 120 (e.g., user names and encrypted passwords, user preferences, and so on).

Figure 2:
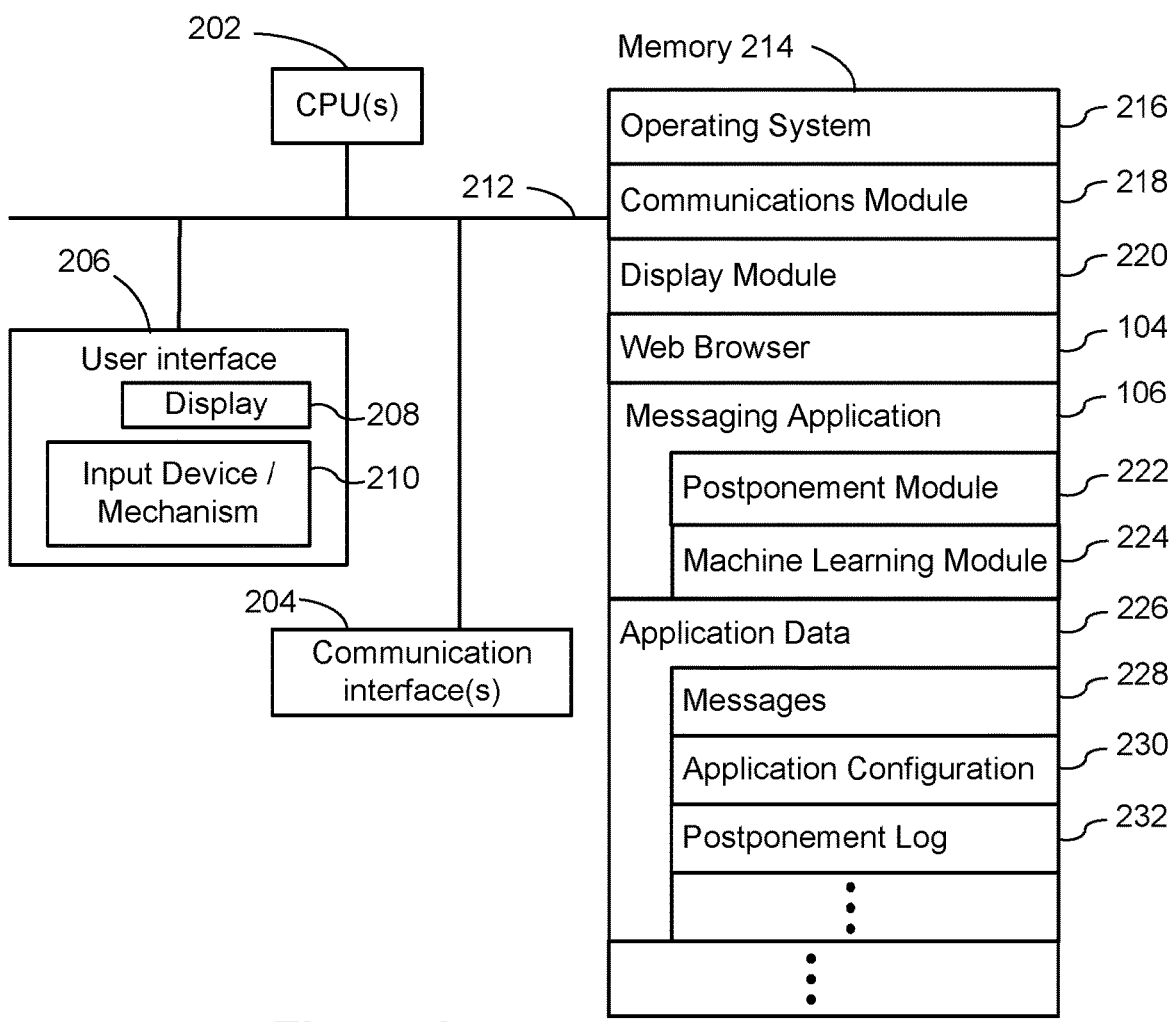
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run a messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). The messaging application includes a postponement module 222, which identifies a set of postponement options when a user decides to postpone a message. This is illustrated below in FIG. 4. In some implementations, the messaging application 106 or the postponement module 222 includes a machine learning module 224. The machine learning module uses historical information about user postponement selections (e.g., from the postponement log 232) to make better predictions about what postponement options are most likely to be selected. This is illustrated below in FIG. 5;
- application data 226, which is used by the messaging application 106. The application data includes messages 228 (e.g., email messages or instant messages). The application data 226 may include configuration data 230, such as user preferences, user history, or the state of configuration options. In some implementations, the application data includes a postponement log 232, which stores information about each postponement selected by the user (e.g., date, time, context, option selected, and parameters associated with the user selection). In some implementations, the application data 226 is stored in a relational database, a CSV file, or an XML file.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
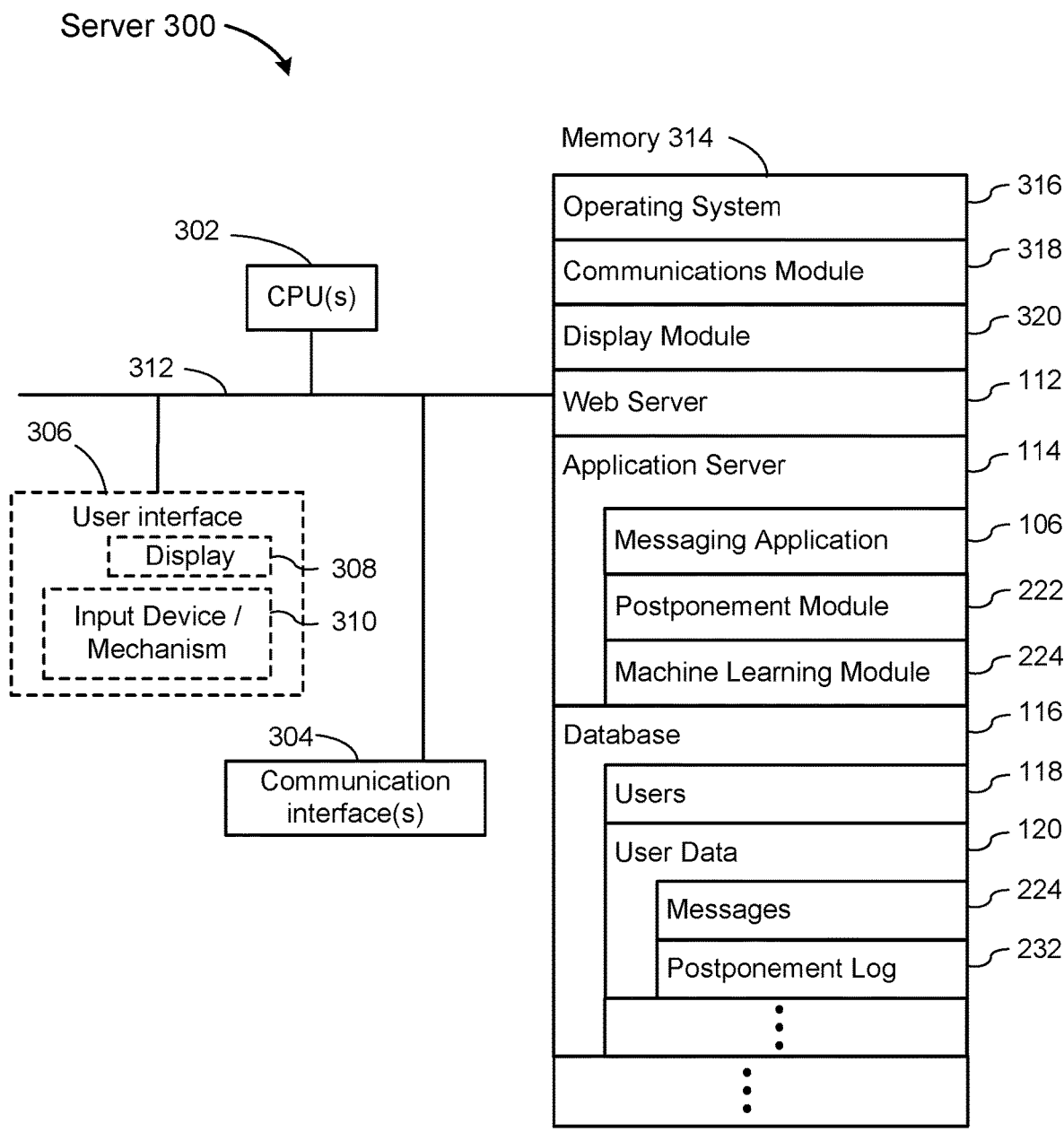
FIG. 3 is a block diagram of a server according to some implementations.

FIG. 3 is a block diagram illustrating a server 300 that may be used in a server system 110. A typical server system includes many individual servers 300, which may be hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

Figure 4:
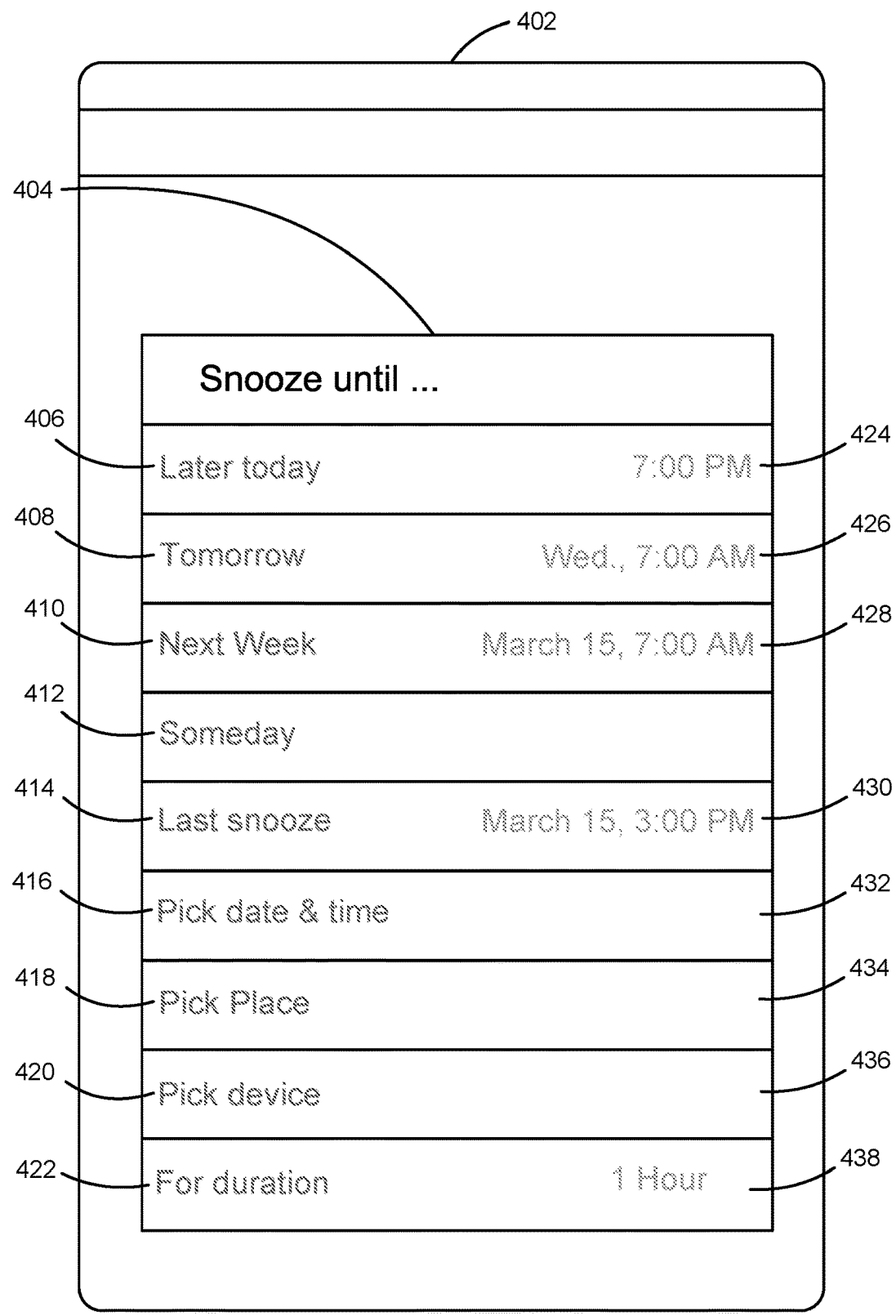
FIG. 4 illustrates a set of message postponement options in accordance with some implementations.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 122, or other communication networks 108, such as the Internet, other wide area networks, local area networks, metropolitan area networks, and so on;
- a display module 320, which receives input from one or more input devices 310, and generates user interface elements for display on a display device 308;
- one or more web servers 112, which receive requests from a client device 102, and return responsive web pages, resources, or links. In some implementations, each request is logged in the database 116;
- one or more application servers 114, which provide various applications (such as an email or other messaging application 106) to the client devices 102. In some instances, applications are provided as a set of web pages, which are delivered to the client devices 102 and displayed in a web browser 104. The web pages are delivered as needed or requested. In some instances, an application is delivered to a client device 102 as a download, which is installed and run from the client device 102 outside of a web browser 104. In some implementations, the application server provides a postponement module 222 as part of the messaging application 106. In other implementations, the postponement module 222 is a separate application provided by the application server 114. As illustrated in FIG. 4, the postpone module 222 provides users with a set of postponement options, then acts on the selected option to postpone a received message accordingly; In some implementations, the application server 114 also provides a machine learning module 224, which may be a separate application or an integrated part of the postponement module 222 or the messaging application 106;
- one or more databases 116, which store various data used by the modules or programs identified above. In some implementations, the database 116 includes a list of authorized users 118, which may include user names, encrypted passwords, and other relevant information about each user. The database 116 also stores user specific data 120 that is used by one or more of the applications provided by the application server. For example, some implementations store the electronic messages 224 for each user. In some implementations, the user data 120 includes a postponement log 232, which stores information about each user-selected postponement.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

As illustrated in FIGS. 2 and 3, the functionality for a messaging application may be shared between a client device 102 and a server system 110. In some implementations, after the messaging application is installed on a client device 102, the majority of the subsequent processing occurs on the client device. For example, the postponement log 232 may be stored solely at the client device, and not on a server 300. In other implementations, the majority of the processing and data storage occurs at a server 300, and the client device 102 uses a web browser 104 to view and interact with the data. For example, the postponement log 232 may be stored only at the server system 110. One of skill in the art recognizes that various allocations of functionality between the client device 102 and the server system 110 are possible, and some implementations support multiple configurations (e.g., based on user selection).

FIG. 4 illustrates a set of message postponement options in accordance with some implementations. The user interface window 404 of postponement options is displayed when a user of a messaging application 402 chooses to postpone a message. In this example, it is Tuesday, Mar. 15, 2016 at 10:23 AM when the user chooses to postpone a message.

Some implementations include a "later today" option 406, with a specific time 424 pre-populated based on the current time. In some implementations, the default time 424 is also based on prior postponement selections by the user (e.g., if the user has previously postponed messages until 7:00 PM on the same time, that may be a good default value). Implementations typically make the default time 424 editable so that the user can adjust the time. Even if the user adjusts the time, the process has been simplified because the user does not need to specify a date.

Some implementations include a "tomorrow" option 408, with a specific day and time 426 selected by default. Similar to the "later today" option 406, the default day and time 426 may be based on historical selections by the user. In some implementations, the day is fixed (i.e., tomorrow), and only the time is editable. In some implementations, both the day and time are editable.

Some implementations include a "next week" option 410, with a specific day and time 428 pre-populated by default. As with the other options, the default day and time 428 are editable by the user. In some implementations, when the user selects the "next week" option 410, the user interface displays the date (e.g., March 15) rather than the day of the week to avoid ambiguity.

Some implementations provide an indefinite postponement option, which may be labeled "someday" 412 as illustrated in FIG. 4. Unlike the other options, a message that has been postponed indefinitely does not automatically reappear at some designated time. Such a message is postponed until the user specifically chooses to view the postponed messages. In some implementations, the user interface for the messaging application includes a control or menu item (not illustrated in FIG. 4) to display the postponed messages.

Some implementations include a "last snooze" option 414, which allows a user to quickly select the same postponement date and time as most recently selected. In this case, the snooze time 430 is displayed, but is typically not editable. In some implementations, the "last snooze" option uses the very last snooze selection, regardless of how it was selected (e.g., regardless of whether the user selected a specific date and time 416, "later today" 406, etc.). In some implementations, the last snooze option looks only at the most recent selection of a specific date and time 416. In some implementations, the last snooze looks at the "pick place" options 418 and the "pick device" options 420, which are described below. In other implementations, the "pick place" options 418 and "pick device" options 420 are not used when identifying the last snooze.

Some implementations provide a "pick date & time" option 416, which allows a user to specify a date and time after the present time. When this option is selected, the region 432 adjacent to the option typically displays one or more editable controls to specify the specific date and time.

Some implementations provide a "pick place" option 418, which allows a user to designate a place when the message will reappear. Some implementations include predefined and/or user-defined place names, which may be correlated with GPS coordinates or other location identifiers. For example, a user may identify a "home" location, and when the user (e.g., the user's smart phone) reaches home, the message is displayed in the message list. In some implementations, the database 116 at the server system 110 includes a table of predefined locations. The predefined locations may include single independent locations (e.g., the LAX airport), or a set of locations that are grouped together (e.g., a chain of sporting goods stores). When the "pick place" option 418 is selected, the region 434 adjacent to the "pick place" option displays a user interface control for selecting a location (e.g., a drop-down list). When a user accesses the messaging application from two or more devices, some implementations will display the postponed message when any of the devices are at the designated location (and the messaging application is running). In other implementations, postponing to a specific place considers only the current device that the user is accessing.

Some implementations support an option to postpone a message until the messaging application is being accessed from a specific device. With this "pick device" option 420, the postponed message disappears from the display on the current device, and reappears later when the user accesses the messaging application from the designated device. For example, a user may access an email application from a work computer and from a home computer. If a personal message arrives while at work, the user may wish to postpone the message until after work while looking at email from home. When the "pick device" option 420 is selected, the region 436 adjacent to the "pick device" option 436 includes an editable list of device options (e.g., in a drop-down list).

Some implementations provide a "for duration" option 422, which allows the user to specify the amount of the delay rather than a specific time when the postponement expires. For example, a user may postpone a message by an hour or a day rather than specifying the exact time when the postponement expires. When the "for duration" option 422 is selected, the default postponement duration 438 is editable.

Some implementations include one or more postponement options that are generated based on context, as described below with respect to FIG. 5. The generated options typically show a specific date and time, and are generally not editable. They are useful when there are specific date and time options that are highly probably for selection so that the user can select one of the options quickly.

The number of options presented and the order in which the options are presented varies based on the implementation, and may be adapted over time based on user selections. For example, if a user has postponed many messages and never selected the "later today" option 406, the "later today" option 406 may be moved further down in the display or removed from the list of postponement options.

Figure 5:
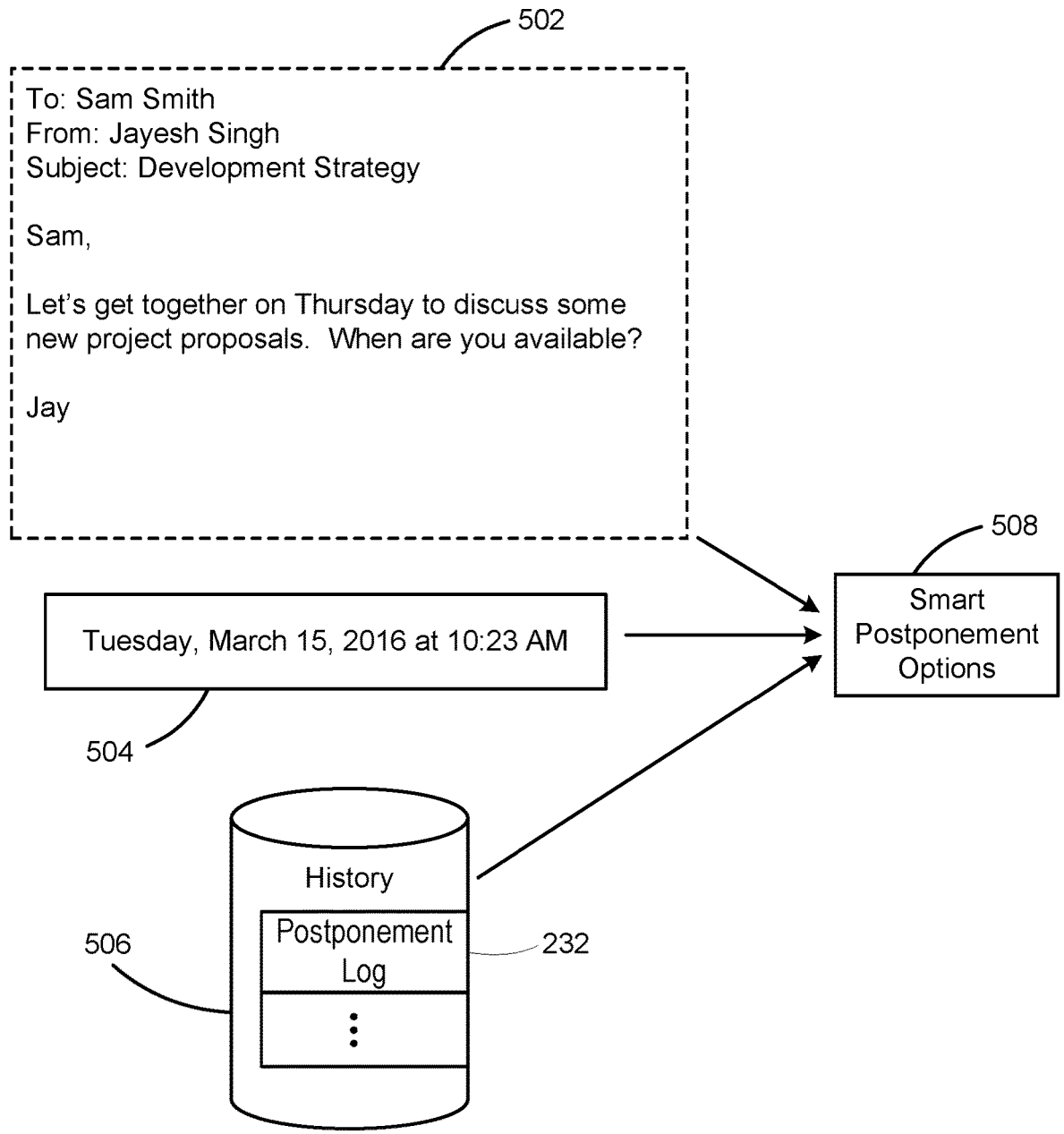
FIG. 5 illustrates schematically the generation of postponement options based on context in accordance with some implementations.

FIG. 5 illustrates schematically the generation of postponement options based on context in accordance with some implementations. The context used in the generation process may include the message itself 502, which includes both the message content and the message metadata (such as sender, recipient, subject, date/time sent, etc.). The context may also include the date/time 504 that the user chooses to postpone the message as well as prior history 506 of the user. In some implementations, the history 506 includes the postponement log 232. The postponement log tracks various data about each message postponement, including both the context for the postponement (e.g., the message and the date/time postponed) as well as what postponement option was selected, including the parameters for the selected postponement option. Using the context information 502, 504, and 506, the postponement module 222 or the machine learning module 224 identifies one or more probable postponement options. For example, some implementations create feature vectors from specific items in the context (e.g., sender, postponement day of week, etc.), and generate options based on machine learning that was trained using the postponement log. Other implementations use a matching algorithm to correlate the message and postponement date/time to one or more "close" records in the postponement log to generate postponement options. In some implementations, the generated options are displayed only if they are sufficiently probable (e.g., multiple prior postponements that follow a consistent pattern).

In some implementations, dates, times, or locations are extracted from the title or body of a message 502, and are used to generate smart suggestions 508. In some instances, extracted dates are used directly as postponement options. For example, if a user receives an email invitation to a party on October 21, the user may choose to postpone the message until that date. In some instances, a user may want to postpone the message until a week before an event or a day before an event, so these options may be suggested. In some implementations, the recommended option(s) for an event depends on the user's history 506. For example, if the user typically postpones event messages until two days before the event, that would be a good choice for postponement recommendations in the future. In some implementations, when there is a specific date extracted from a message 502, the postponement options include both the specific date as well as an option to select an offset from that date (e.g., N days/weeks before the event date).

Some implementations use extracted times to generate postponement options. For example, if a user receives a message to "meet me at 6:00," a good postponement option may be to postpone the message until shortly before 6:00 (e.g., 5:00, 5:30, or 5:45, depending on other factors). In some implementations, the postponement option is further determined based on location information. For example, if the intended 6:00 meeting location is near the user's current location, postponing until 5:45 may be appropriate, whereas a distant location may require more time and thus postponement until 5:00 might be better.

Other examples include postponing a message about a flight until 24 hours before the flight, or postponing a haircut reminder until an hour before the appointment.

Some implementations use a location extracted from a message 502 as a default "Pick Place" option 418. For example, if the message 502 identifies a specific store, mall, park, or other place the user might visit, that is a more useful option for postponement.

Figure 6A:
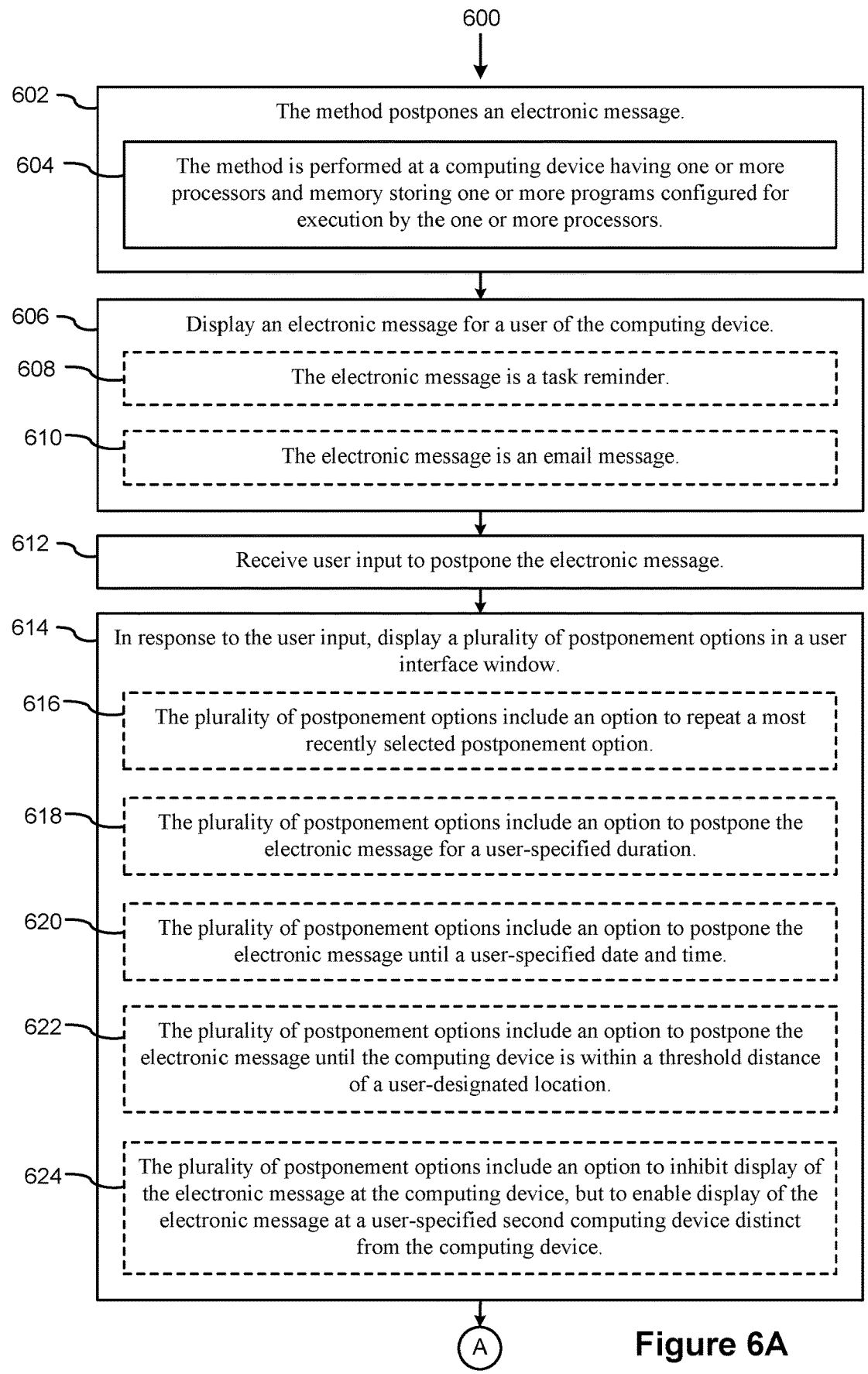
FIGS. 6A and 6B provide a flowchart of a process, performed at a client computing device, for postponing electronic messages according to some implementations.
Figure 6B:
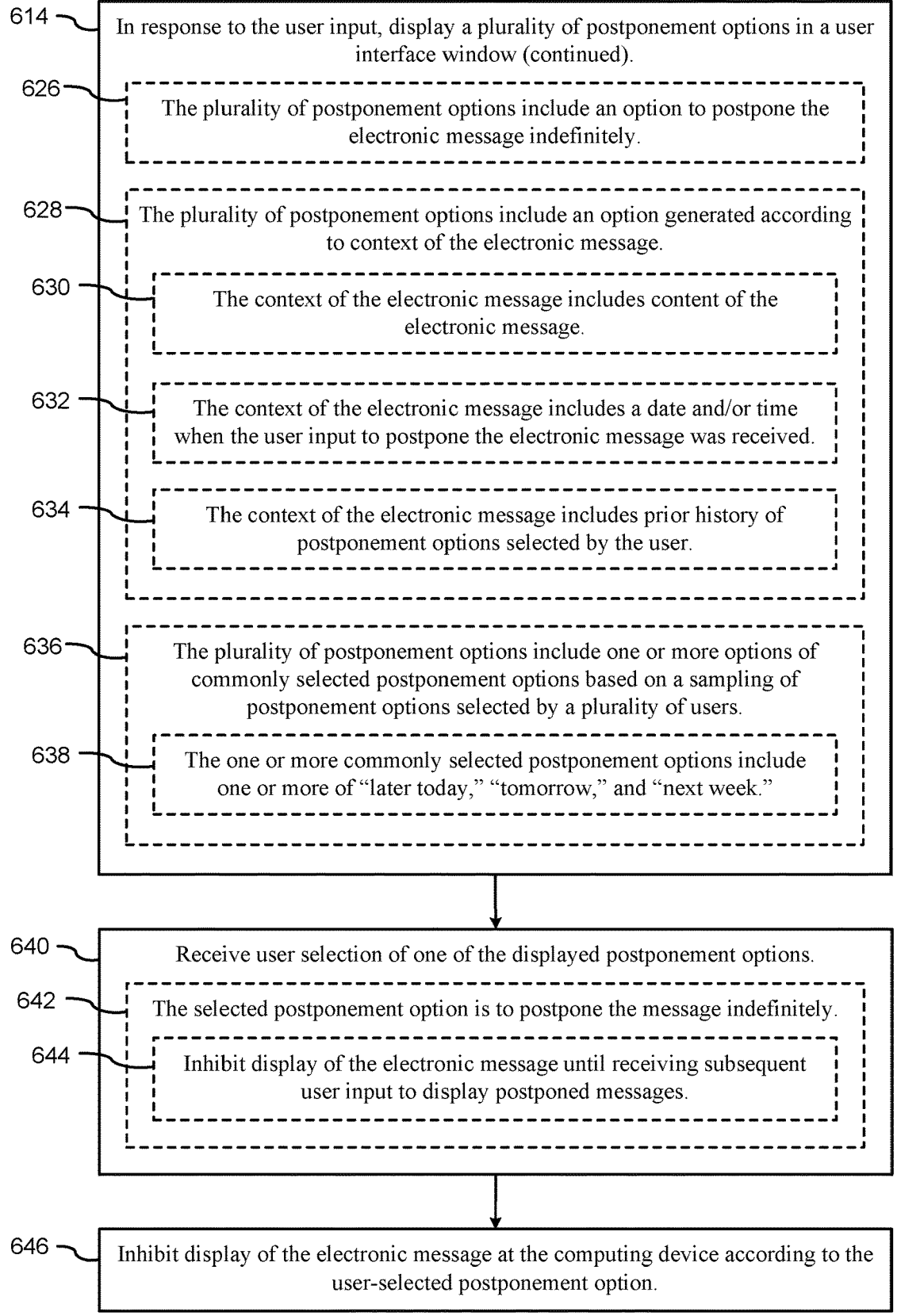

FIGS. 6A and 6B provide a flowchart of a process 600, performed by a computing device, for postponing (602) an electronic message. The method is performed (604) at a computing device 102 having one or more processors and memory. The memory stores (604) one or more programs configured for execution by the one or more processors.

The process 600 displays (606) an electronic message for a user of the computing device. Typically the message is displayed in a graphical user interface. In some implementations, the electronic message is (610) an email message. In some implementations, the electronic message is (608) a task reminder. In some instances, the process receives (612) user input to postpone the electronic message. In response to the user input, the process 600 displays (614) a plurality of postponement options in a user interface window 404, as illustrated in FIG. 4.

Various implementations provide a variety of postponement options in the user interface window 404. In some implementations, the postponement options include (616) an option to repeat a most recently selected postponement option. This is illustrated in FIG. 4 as the "last snooze" option 414. In some implementations, the postponement options include (618) an option to postpone the electronic message for a user-specified duration, as illustrated by the "for duration" option 422 in FIG. 4. In some implementations, the postponement options include (620) an option to postpone the electronic message until a user-specified date and time, as illustrated by the "pick date and time" option 416 in FIG. 4.

Some implementations support postponement options that are not based on time. For example, some implementations provide (622) a postponement option that postpones the electronic message until the computing device is within a threshold distance of a user-designated location, as illustrated by the "pick place" option 418 in FIG. 4. As another example, some implementations provide (624) a postponement option that inhibits display of the electronic message at the computing device, but enables display of the electronic message at a user-specified second computing device distinct from the computing device. This example is illustrated above by the "pick device" option 420 in FIG. 4.

Some implementations provide (626) a postponement option that postpones an electronic message indefinitely. When selected, the postponed message is not scheduled to be displayed again at any particular time.

Some implementations also provide (628) one or more smart postponement options 508. Smart postponement options are generated (628) according to the context of the electronic message, as illustrated above in FIG. 5. In some instances, the context includes (630) the content of the electronic message (i.e., the message data or metadata). For example, the generated postponement options could depend on the sender (e.g., don't postpone messages from the boss), the message (e.g., postpone messages about project X until next Monday), or the time the message was sent (e.g., postpone messages received after 6:00 PM until the next morning at 8:00 AM). In some instances, the context includes (632) a date and/or time that the user provided input to postpone the electronic message. For example, history may show that a user who initiates postponement after 4:00 PM commonly postpones those messages until the next day at 10:00 AM. As illustrated here, the smart options 508 may be generated using the date/time that a message was sent (or received) and/or the date/time that the user selects postponement.

In some instances, the smart postponement options 508 are generated (634) based on user history 506, such as the postponement log 232. The history 506 can identify what postponement options the user has previously selected and under what circumstances those options were selected. When the history shows a pattern, that pattern can be used to generate (634) appropriate postponement options 508 in the future. In some implementations, the recognition of patterns uses machine learning (e.g., using the machine learning module 224).

Some implementations utilize the history of other people (in the aggregate) to identify common postponement options. For example, some implementations provide (636) one or more postponement options commonly selected by other users. In some implementations, the commonly selected postponement options include (638) "later today," "tomorrow," and/or "next week."

In some implementations, the other users whose data is accessed to generate the common options are selected based on similarity to the specific user who is about to make a postponement selection. For example, aggregated information from user profiles may identify postponement options that are more likely for similar users.

Using the user interface window 404 with the postponement options, the user selects (640) one of the postponement options, and the process inhibits (646) display of the electronic message at the computing device according to the user-selected option. For example, waiting until the designated time to display the message, waiting until the user arrives at the designated location, or waiting until the user is accessing the messaging application on the designated device.

In some instances, the user selects (642) the postponement option to postpone indefinitely. In this instance, the process inhibits (644) display of the electronic message until receiving subsequent user input to display postponed messages.

Although postponement has been described mainly with respect to individual messages, the same postponement options can be applied to implementations that group messages together into conversations or clusters. For example, some email applications group all replies with their original message, creating a single conversation or thread. Replies to emails (and replies to those replies) are displayed in one place, in order, making it easier to understand the context of a message.

In some implementations, clusters group together electronic messages having a collective association (e.g., a cluster of promotional material that includes advertisements for retail sales, newsletters from stores, and so on). Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety.

In some implementations, an object in a message list or inbox represents a cluster of messages. A cluster of messages comprises a plurality of messages sharing a common set of characteristics that meet a first predefined criterion (e.g., a clustering criterion based on message content). The plurality of messages may be sent at different times, but cover the same topic and each has the user as a common recipient.

In some implementations, the clusters may be modified by a user. For example, in some implementations a user can eliminate a cluster in a single operation (e.g., a hand swipe gesture or clicking on a designated user interface control). Removing a cluster does not delete the messages in the cluster. In some implementations, when a cluster is removed, the individual messages may be re-clustered in a different way, or grouped together with other clusters.

In some implementations, each object in the message list or inbox is one of a task, a message, or a plurality of messages (e.g., a cluster of messages or a conversation). In some implementations, the message list or inbox includes other types of objects as well.

When messages are grouped into conversations or clusters, a snooze selection applies to the conversation or cluster, which is not displayed during the snooze. After the user-selected snooze period, the conversation or cluster reappears in the message list or inbox. In some implementations, at the end of the snooze period, the postponement module 222 inserts a user-invisible "bump" message into the conversation thread or cluster corresponding to the message, which triggers the conversation or cluster to be redisplayed for the user.

In implementations that group messages together into conversations, a snoozed conversation will reappear in the user's conversation list early if the user receives another message that belongs to the snoozed conversation. For example, suppose a user snoozes a conversation until tomorrow morning at 8:00 AM, but later in the day receives a reply to the conversation from a coworker. The conversation, including the new message, is then displayed in the conversation list at the time the new reply is received. Some implementations apply this to message clusters.

Some implementations support a closely related "mute" feature, which is essentially an uninterruptable snooze. Even if there is a new reply in a conversation, the muted conversation does not reappear on the conversation list until the designated time. Some implementations support a set of mute options that are the same as (or similar to) the snooze options illustrated in FIG. 4. In some implementations, "snooze" and "mute" are implemented together, with a user interface control (e.g., a check box) to indicate whether the postponement can be interrupted by a new reply message to the postponed conversation.

In some implementations, interrupting a snooze or mute based on a new reply received before the end of the postponement period depends on how the new reply is addressed. For example, in some implementations, a "snoozed" conversation is brought back based on any new reply message. On the other hand, a "muted" conversation is brought back for a specific user only when the new reply is addressed to the specific user (e.g., a "TO" recipient rather than a "CC" recipient).

Some implementations provide a user interface in which electronic messages and task reminders are intermingled. In some implementations, an electronic message can be converted to a task reminder when a user creates a task annotation associated with the message. In the following, both electronic messages and task reminders are referred to as "items."

In some implementations, the user interface for a messaging application 106 includes three regions for the items, and each of the items is associated with a unique one of the regions (although the association may change over time). The first region is sometimes referred to as the "upcoming" region, and represents items that are not yet active. The second region is sometimes referred to as the "inbox" region, or just the "inbox," and represents the items that are currently active. The third region is for items that are "done." In some instances, an item is done when an associated task is completed. In other instances, an item is done when a user chooses to dismiss it (for any reason). In some cases, an item is an informational email, and it is marked as done as soon as it is read.

In some implementations, each of the three regions is either "open" or "closed." In some implementations, at most one of the three regions may be open at any given time. In some implementations, when one of the regions is closed, it is smaller, and displays a label for the region (e.g., "upcoming," "inbox," or "done"). In some implementations, when a region is open, it is larger and displays one or more of the items (if there are any) that are associated with the region.

In some implementations, newly received electronic messages are associated with the second region. That is, the messages are active. A user can designate such a message as done, in which case it becomes associated with the third region. A user can also choose to postpone an electronic message, as described above with respect to FIG. 4. When a user postpones a message, the message becomes associated with the first region (it is upcoming rather than active).

Later, when the postponed message reaches the target time (or target location, etc.), the message becomes associated with the second region (e.g., at the top of the inbox).

When a task reminder is created without a specific target time (or the time is in the past), it is associated with the inbox region (i.e., it is active). On the other hand, if a newly created task reminder is assigned a specific time that is in the future, the new task reminder is associated with the first region (i.e., it is upcoming). When a task reminder is in the upcoming region and the target time is reached, it becomes associated with the second region. Like electronic messages, task reminders can be postponed, in which case the task reminder becomes associated with the first region. When a task reminder is marked as done, it becomes associated with the third region.

Some implementations also provide for recurring task reminders. In some implementations, a user sets up a master task reminder in the first region. The master task reminder includes a schedule for when it recurs (e.g., monthly on the 29th of each month or weekly on Fridays) and an associated label (e.g., "pay rent" or "work out at the gym"). In some implementations, the master task reminder stores the next recurring date for the reminder. When the next recurring date arrives, an instance of the task reminder is created in the inbox, and the master task reminder resets the next recurring date. Once an instance task reminder is created, it behaves like an ordinary task reminder. For example, a task reminder instance can be postponed (moving it into the upcoming region) or can be marked as done (moving it into the done region). Changes to a master task reminder affect all future instances that will be created, but has no effect on task reminder instances that were previously created.

Items in each of the regions can be sorted. By default, the items in the inbox are sorted inverse chronologically based on when they were received. In some implementations, the items in the done region are sorted based on when they were marked as done. In other implementations, the items in the done region are sorted based on when they were received in the inbox. The upcoming region may include multiple subsections. The first subsection shows items sorted by the date/time that they will become active (typically with the closest to active on the top of the list). When one or more items are postponed to a location or postponed until accessed by a certain device, those items are displayed in one or more additional subsections (e.g., sorted by location name or sorted by device name).

In this way some implementations integrate a messaging application and a task management application so that users can more effectively manage what they do.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method, comprising:
    identifying, with one or more processors of a computing device, a plurality of electronic messages for a user based on a characteristic shared by each message of the plurality of messages;
    displaying an object identifying the plurality of electronic messages;
    while displaying the object, receiving, with the one or more processors, user input to postpone the plurality of electronic messages;
    in response to the user input to postpone the plurality of electronic messages, displaying a list containing a plurality of postponement options, wherein the displayed list of postponement options includes:
        a first option that prompts the user to specify a date and time for postponing the plurality of electronic messages; and
        a second option that specifies a particular postponement date and time selected by the computing device according to context of the plurality of electronic messages, wherein the context includes content of one or more of the electronic messages in the plurality of electronic messages;
    receiving, with the one or more processors, user selection of a postponement option of the displayed list of postponement options; and
    inhibiting, with the one or more processors, display of the plurality of electronic messages at the computing device according to the selected postponement option;
    wherein the second option is generated as a probable postponement option based at least in part on information derived from one or more previously selected postponement options in a postponement log accessible by the computing device.

2. The method of claim 1, wherein the plurality of electronic messages comprises at least one task reminder, at least one email message, or a combination of the at least one task reminder and the at least one email message.

3. The method of claim 1, wherein the displayed list of postponement options includes an additional option to repeat a postponement option previously selected by the user to postpone one or more electronic messages having the shared characteristic.

4. The method of claim 1, wherein the displayed list of postponement options includes an additional option to postpone the plurality of electronic messages for a user-specified duration.

5. The method of claim 1, wherein the displayed list of postponement options includes an additional option to postpone the plurality of electronic messages until the computing device is within a threshold distance of a user-designated location.

6. The method of claim 1, wherein the displayed list of postponement options includes an additional option to inhibit display of the plurality of electronic messages at the computing device, but to enable display of the plurality of electronic messages at a user-specified second computing device distinct from the computing device.

7. The method of claim 1, wherein:
the displayed list of postponement options includes an additional option to postpone the plurality of electronic messages indefinitely,
the selected postponement option is the additional option to postpone indefinitely, and
the method further comprises inhibiting display of the plurality of electronic messages according to the selected postponement option until receiving subsequent user input to display the postponed plurality of electronic messages.

8. The method of claim 1, wherein the second option includes a plurality of alternatives selected by the computing device, each alternative providing a different postponement date and time.

9. The method of claim 1, further comprising:
generating, with the one or more processors, a plurality of probable postponement options; and
selecting, by the one or more processors, at least the second option from the plurality of probable postponement options for display upon determination by the one or more processors that the second option satisfies a probability threshold.

10. The method of claim 1, wherein the context of the plurality of electronic messages used by the computing device to select the particular date and time includes a date or time when the user input to postpone the plurality of electronic messages was received.

11. The method of claim 1, wherein the context of the plurality of electronic messages used by the computing device to select the particular postponement date and time includes a prior history of postponement options selected by the user.

12. The method of claim 1, wherein the displayed list of postponement options includes one or more options of commonly selected postponement options based on a sampling of postponement options selected by a plurality of users.

13. The method of claim 12, wherein the one or more commonly selected postponement options include one or more options selected from the group consisting of later today, tomorrow, and next week.

14. The method of claim 1, wherein the shared characteristic is that each message in the plurality of messages belongs to a single conversation or message thread.

15. The method of claim 1, wherein the shared characteristic is either that each message in the plurality of messages concerns the same topic, or that each message in the plurality of messages includes promotional material or an advertisement.

16. The method of claim 1, wherein the shared characteristic is that each message in the plurality of messages shares a label selected by the user.

17. The method of claim 1, wherein the plurality of electronic messages is a cluster of messages, the method further comprising:
in response to a user operation indicating removal of the cluster, either re-clustering individual messages of the plurality of electronic messages in a different way or grouping the individual messages with one or more other clusters.

18. The method of claim 1, further comprising:
in response to the user receiving an additional electronic message having the shared characteristic, displaying the plurality of electronic messages prior to the date and time specified in the selected postponement option.

19. A computing device, comprising:
one or more processors;
memory; and
one or more programs stored in the memory configured for execution by the one or more processors, the one or more programs comprising instructions for:
identifying a plurality of electronic messages for a user based on a characteristic shared by each message of the plurality of messages;
displaying an object identifying the plurality of electronic messages;
while displaying the object, receiving user input to postpone the plurality of electronic messages;
in response to the user input to postpone the plurality of electronic messages, displaying a list containing a plurality of postponement options, wherein the displayed list of postponement options includes:
a first option that prompts the user to specify a date and time for postponing the plurality of electronic messages; and
a second option that specifies a particular postponement date and time selected by the computing device according to context of the plurality of electronic messages, wherein the context includes content of one or more of the electronic messages in the plurality of electronic messages;
receiving user selection of a postponement option of the displayed plurality of postponement options; and
inhibiting, with the one or more processors, display of the plurality of electronic messages at the computing device according to the selected postponement option;
wherein the second option is generated as a probable postponement option based at least in part on information derived from one or more previously selected postponement options in a postponement log accessible by the computing device.

20. A non-transitory computer readable storage medium storing one or more programs configured for execution by a computing device having one or more processors and memory, the one or more programs comprising instructions for:
identifying a plurality of electronic messages for a user based on a characteristic shared by each message of the plurality of messages;
displaying an object identifying the plurality of electronic messages;
while displaying the object, receiving user input to postpone the plurality of electronic messages;
in response to the user input to postpone the plurality of electronic messages, displaying a list containing a plurality of postponement options, wherein the displayed list of postponement options includes:
a first option that prompts the user to specify a date and time for postponing the plurality of electronic messages; and
a second option that specifies a particular postponement date and time selected by the computing device according to context of the plurality of electronic messages, wherein the context includes content of one or more of the electronic messages in the plurality of electronic messages;
receiving user selection of a postponement option of the displayed plurality of postponement options; and inhibiting, with the one or more processors, display of the plurality of electronic messages at the computing device according to the selected postponement option;

wherein the second option is generated as a probable postponement option based at least in part on information derived from one or more previously selected postponement options in a postponement log accessible by the computing device.

* * * * *